US010071602B2

(12) United States Patent
Motomitsu et al.

(10) Patent No.: US 10,071,602 B2
(45) Date of Patent: Sep. 11, 2018

(54) HEAVY DUTY PNEUMATIC TIRE

(71) Applicant: The Yokohama Rubber Co., LTD., Minato-ku, Tokyo (JP)

(72) Inventors: Takamasa Motomitsu, Hiratsuka (JP); Shoei Kakuta, Hiratsuka (JP); Hideki Hamanaka, Hiratsuka (JP); Yukihito Yamaguchi, Hiratsuka (JP); Risa Tauchi, Hiratsuka (JP); Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/328,434

(22) PCT Filed: Jul. 23, 2015

(86) PCT No.: PCT/JP2015/070935
§ 371 (c)(1),
(2) Date: Jan. 23, 2017

(87) PCT Pub. No.: WO2016/013605
PCT Pub. Date: Jan. 28, 2016

(65) Prior Publication Data
US 2017/0210179 A1    Jul. 27, 2017

(30) Foreign Application Priority Data

Jul. 23, 2014  (JP) .................................. 2014-149833
May 13, 2015  (WO) .................. PCT/JP2015/063719

(51) Int. Cl.
*B60C 11/11*   (2006.01)
*B60C 11/13*   (2006.01)
(Continued)

(52) U.S. Cl.
CPC ............... *B60C 11/13* (2013.01); *B60C 11/11* (2013.01); *B60C 11/0311* (2013.01); *B60C 2009/2016* (2013.01); *B60C 2200/065* (2013.01)

(58) Field of Classification Search
CPC ................. B60C 11/0311; B60C 11/11; B60C 2009/2016
See application file for complete search history.

(56) References Cited

U.S. PATENT DOCUMENTS 6,076,579 A * 6/2000 Matsumoto ......... B60C 11/0309
                                                152/209.15
D457,128 S * 5/2002 Robert ........................ D12/579
(Continued)

FOREIGN PATENT DOCUMENTS

EP          573237 A1 * 12/1993
GB         1487958 A  * 10/1977
(Continued)

OTHER PUBLICATIONS

Machine translation for Japan 2004-262295 (no date).*
(Continued)

*Primary Examiner* — Steven D Maki
(74) *Attorney, Agent, or Firm* — Thorpe North & Western

(57) ABSTRACT

A tread pattern is provided with: shoulder lug grooves open at ground contact edges; center lug grooves having two ends; circumferential primary grooves formed in a wave-like shape by alternately connecting ends of the center lug grooves and the inner ends in the tire width direction of the shoulder lug grooves; and center blocks defined by the center lug grooves and the pair of circumferential primary grooves. The belt portion of the tire includes first cross belt layers and second cross belt layers. The ratio of the width WB of the center blocks in the tire width direction to the belt width W1 of the belt layer having the shortest width in the (Continued)

tire width direction among the first cross belt layers is in the range from 0.6 to 0.9.

14 Claims, 7 Drawing Sheets

(51) Int. Cl.
*B60C 9/20* (2006.01)
*B60C 11/03* (2006.01)

(56) References Cited

U.S. PATENT DOCUMENTS

| | | | |
|---|---|---|---|
| 2007/0199633 A1 | 8/2007 | Hayashi | |
| 2008/0078488 A1 | 4/2008 | Yoda | |
| 2009/0032157 A1* | 2/2009 | Inoue | B60C 11/0311 152/209.8 |
| 2017/0240000 A1* | 8/2017 | Manabe | B60C 11/11 |

FOREIGN PATENT DOCUMENTS

| | | | |
|---|---|---|---|
| JP | 07-025204 A | * | 1/1995 |
| JP | H09-136514 | | 5/1997 |
| JP | 11-034615 A | * | 2/1999 |
| JP | 2004-098914 | | 4/2004 |
| JP | 2004-224131 | | 8/2004 |
| JP | 2004-262295 A | * | 9/2004 |
| JP | 2006-151083 | | 6/2006 |
| JP | 2008-279976 | | 5/2007 |
| JP | 2007-191093 | | 8/2007 |
| JP | 2010-125999 | | 6/2010 |
| WO | WO 2006/001202 | | 1/2006 |
| WO | WO 2006/057169 | | 6/2006 |

OTHER PUBLICATIONS

Machine translation for Japan 07-025204 (no date).*
Machine translation for Japan 11-034615 (Year: 2009).*
International Search Report for International Application No. PCT/JP2015/070935 dated Aug. 25, 2015, 4 pages, Japan.

* cited by examiner

US 10,071,602 B2

HEAVY DUTY PNEUMATIC TIRE

TECHNICAL FIELD

The present technology relates to a heavy duty pneumatic tire having a tread pattern.

BACKGROUND ART

Recent pneumatic tires are required to have various kinds of enhanced performance, and their tread patterns are contrived to enhance the performance. Heavy duty tires are provided with tread patterns that enhance traction performance.

For example, heavy duty pneumatic tires with both enhanced traction properties when running on bad roads at the terminal stage of wear and wet performance during high-speed running are known (see Japanese Unexamined Patent Application Publication No. H09-136514A). This heavy duty pneumatic tire is a pneumatic tire having at least one circumferential groove extending in the circumferential direction, and a plurality of lateral grooves arranged at intervals in the circumferential direction on both sides of the circumferential groove, and linking with the circumferential groove; wherein (1) the circumferential groove extends in the circumferential direction in a tread central region that corresponds to 50% of the tread width;

(2) the depth of the circumferential groove is 5% of the tread width or greater; and (3) the depth of at least lateral grooves disposed in both side sections of the tread among the lateral grooves is 109% of the depth of the circumferential groove or greater.

Accordingly, both the traction properties when running on bad roads and wet performance during high-speed running can be enhanced.

With the heavy duty pneumatic tire as described above, although the traction properties in the terminal stage of wear can be enhanced, the cut resistance can be easily reduced by the occurrence of defects or the like in blocks on the tread portion, due to off-road running.

SUMMARY

For large tires of, for example, 49 inches and larger fitted to dump trucks running off-road at mines and the like, it is desirable that the tread cut resistance be enhanced while also enhancing the traction properties, from the point of view of effective use of the tires.

The present technology provides a heavy duty pneumatic tire which is a pneumatic tire provided with a tread pattern, with enhanced traction properties and enhanced cut resistance.

A first aspect of the present technology is a pneumatic tire provided with a tread pattern.

The belt portion of the pneumatic tire includes:

first cross belt layers made from a pair of belt layers in which orientations of belt cords with respect to the tire circumferential direction are inclined in a first side and a second side that are different from each other in the tire width direction, and second cross belt layers provided on the outer side in the tire radial direction of the first cross belt layers, made from a pair of belt layers in which orientations of belt cords with respect to the tire circumferential direction are inclined in the first side and the second side that are different from each other in the tire width direction.

The tread pattern of the pneumatic tire includes:

a plurality of center lug grooves provided at intervals in the tire circumferential direction, that pass through the tire equator line and having two ends in half tread regions on the first side and the second side in the tire width direction relative to the tire equator line;

a plurality of shoulder lug grooves provided at intervals in the tire circumferential direction, extending toward an outer side in the tire width direction in each of the half tread regions with outer ends thereof in the tire width direction opening at ground contact edges on both sides in the tire width direction, each of the plurality of shoulder lug grooves being provided between center lug grooves that are adjacent to each other in the tire circumferential direction from among the center lug grooves;

a pair of circumferential primary grooves, one in each of the half tread regions, extending around the whole tire periphery while connecting alternately to an end of the center lug grooves and an end on the inner side in the tire width direction of the shoulder lug grooves to form a wave-like shape, and having a groove width narrower than that of the shoulder lug grooves provided in each half tread region; and a plurality of center blocks formed in one row in the tire circumferential direction partitioned by the center lug grooves and the pair of circumferential primary grooves.

The block width WB of the center blocks in the tire width direction, a belt width W1 of a belt layer from among the first cross belt layers, and a belt width W2 of a belt layer from among the second cross belt layers being related with the ratio WB/W1 in the range from 0.6 to 0.9, the ratio WB/W2 in the range from 0.9 to 1.2, and W1 greater than W, where the belt width W1 is a shorter belt width in the tire width direction among the first cross belt layers, and the belt width W2 is a shorter belt width in the tire width direction among the second cross belt layers.

The center lug grooves include a first groove turning portion on the first side, bent or curved so as to protrude towards a third side in the tire circumferential direction, and a second groove turning portion on the second side, bent or curved so as to protrude towards a fourth side on the opposite side to the third side in the tire circumferential direction.

The center lug grooves each include a first connection end portion on the first side and a second connection end portion on the second side at which the center lug grooves connect to the circumferential primary grooves at a tip on the inner side in the tire width direction of the circumferential primary grooves. The second connection end portion of each of the center lug grooves are on the third side in the tire circumferential direction of the first connection end portion.

In connection with the center line position in the groove width direction of the center lug grooves, preferably the inclination angle with respect to the tire width direction of a first straight line that connects the first connection end portion and a protruding end that protrudes towards the third side in the tire circumferential direction of the first groove turning portion, and the inclination angle with respect to the tire width direction of a second straight line that connects the second connection end portion and a protruding end that protrudes towards the fourth side in the tire circumferential direction of the second groove turning portion are larger than the inclination angle with respect to the tire width direction of a third straight line that connects the first connection end portion and the second connection end portion of each of the center lug grooves.

In connection with the center line position in the groove width direction of the center lug grooves, preferably a portion of each of the center lug grooves between the protruding end of the first groove turning portion that protrudes towards the third side in the tire circumferential direction and the first connection end portion is on the first straight line or on the third side with respect to the first straight line. Also preferably a portion of each of the center lug grooves between the protruding end of the second groove turning portion that protrudes towards the fourth side in the tire circumferential direction and the second connecting end portion is on the second straight line or on the fourth side with respect to the second straight line.

Preferably, a raised bottom portion is provided in the pair of circumferential primary grooves where the groove depth is shallower in part.

Preferably, the ratio D2/T of a groove depth D2 of a shallowest portion of the raised bottom portion and the thread width T in the tire width direction of the tread portion is less than 0.05.

Preferably, the ratio WB/T of the block width WB of the center blocks to a tread width T in the tire width direction of the tread portion is from 0.35 to 0.55.

Preferably, the belt portion further includes a pair of third cross belt layers provided on the outer side in the tire radial direction of the second cross belt layers, the orientations of belt cords of which with respect to the tire circumferential direction being inclined in the first side and the second side that are different from each other in a tire width direction, and the belt width W3 that is a shortest belt width in the tire width direction of a belt layer in the third cross belt layers satisfies the ratio WB/W3 in the range from 0.5 to 0.8, and W3 greater than W1.

Preferably, the circumferential primary grooves each include a third groove turning portion that turns in a protruding shape to the outer side in the tire width direction, and a fourth groove turning portion that turns in a protruding shape to the inner side in the tire width direction, and the circumferential primary grooves each have regions that include the third groove turning portion and the fourth groove turning portion where edge cross-sections of a groove wall on a side of each of the center blocks are rounded in a circular arc shape.

Preferably, the center lug grooves each include a lug groove turning portion in a bent shape or a curved shape, and have regions that include the lug groove turning portion where an edge cross-section of the groove wall is rounded with a circular arc shape.

Preferably, a smallest inclination angle with respect to the tire circumferential direction of the belt cords in the first cross belt layers is from 20 to 24°.

Preferably, a smallest inclination angle with respect to the tire circumferential direction of the belt cords in the second cross belt layers is from 16 to 20°.

Preferably, all of corner portions of the center blocks are obtuse angle corner portions.

Preferably, groove widths of the pair of circumferential primary grooves and the center lug grooves are from 7 to 20 mm.

Preferably, the heavy duty pneumatic tire is fitted to a construction vehicle or an industrial vehicle.

According to the tire as described above, the traction properties can be enhanced and the cut resistance can be enhanced.

DETAILED DESCRIPTION

A detailed description will be given below of a configuration of the pneumatic tire of the present technology with reference to the drawings.

In this Specification, the tire width direction refers to the direction of the central axis of rotation of the pneumatic tire, and the tire circumferential direction refers to the direction of rotation of the rotating surface of the tread surface, when the tire rotates around the central axis of rotation of the tire. The tire radial direction refers to the direction radiating from the tire rotational center axis. The outer side in the tire radial direction refers to the side away from the tire rotational center axis, and the inner side in the tire radial direction refers to the side approaching the tire rotational center axis. Also, the outer side in the tire width direction refers to the side in the tire width direction away from the tire equator line, and the inner side in the tire width direction refers to the side approaching the tire equator line in the tire width direction.

Also, in this Specification heavy duty tire refers to tires described in the Japan Automobile Tyre Manufacturers Association, Inc. (JATMA) YEAR BOOK 2014, Section C, as well as Type 1 tires (dump trucks, scrapers), Type 2 tires (graders), Type 3 tires (shovel loaders, and the like), Type 4 tires (tire rollers), tires for mobile cranes (track cranes, wheel cranes) as described in Section D, as well as tires for vehicles described in the TRA 2013 YEAR BOOK Section 4 or Section 6.

Figure 1:
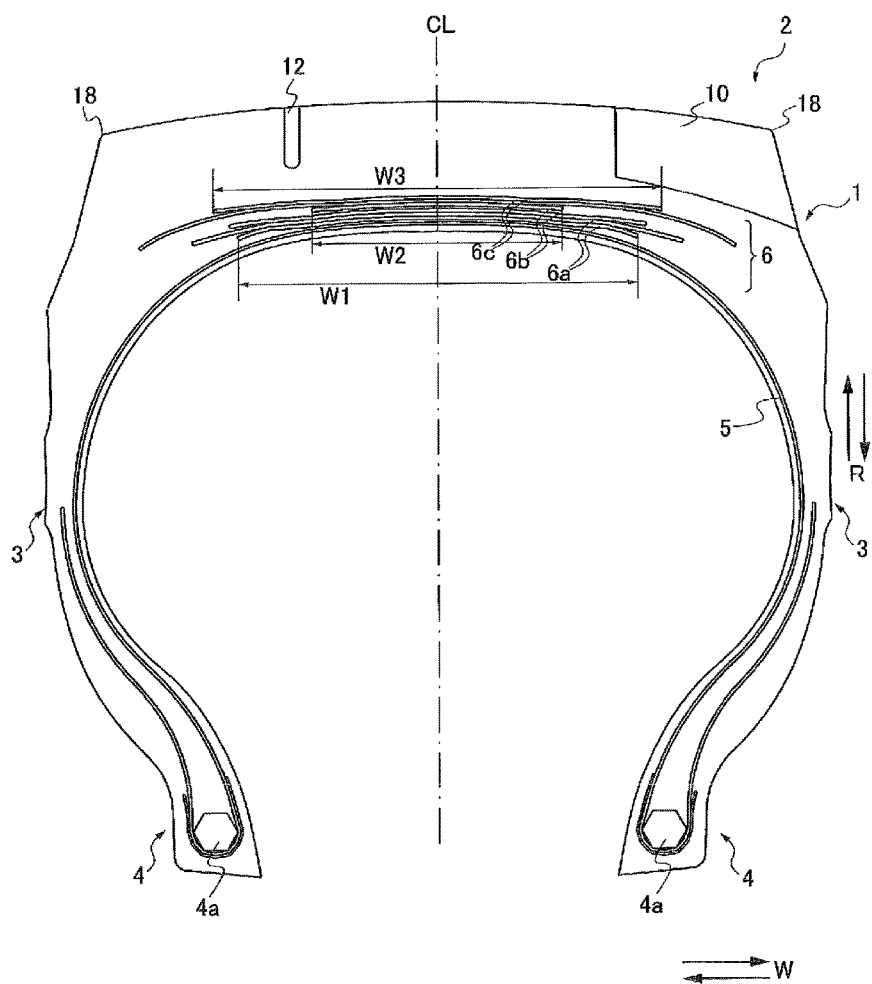
FIG. 1 is a cross-sectional view of an example of a pneumatic tire according to the present embodiment.

FIG. 1 is a cross-sectional view sectioned at a plane that passes through the tire rotational axis, passing through the line X-X' in FIG. 2 that is described later, in a pneumatic tire according to the present embodiment (hereafter simply refer to as tire). In FIG. 1, the tire radial direction is indicated as R (two arrows pointing towards the different sides), and the tire width direction is indicated as W (two arrows pointing towards the different sides).

In FIG. 1, a tire 1 has a tread portion 2, a sidewall portion 3, and a bead portion 4. The bead portion 4 includes a pair of bead cores 4a on the two sides in the tire width direction. A carcass layer 5 extends between the pair of bead cores 4a. Both ends of the carcass layer 5 are wrapped around a bead core 4a from the tire inner side to the tire outer side. The carcass layer 5 may be configured from a single carcass ply, or may be configured from a plurality of carcass plies.

Belt layers (belt portion) 6 are provided on the outer circumferential side of the carcass layer 5 at the tread portion 2. First cross belt layers 6a, second cross belt layers 6b, and third cross belt layers 6c are provided in the belt layers (belt portion) 6 in that order from the inner side to the outer side in the tire radial direction. Each of the first cross belt layers 6a, the second cross belt layers 6b, and the third cross belt layers 6c is configured from a pair of belt layers. The pair of belt layers of each of the first cross belt layers 6a, the second cross belt layers 6b, and the third cross belt layers 6c has reinforcing cords inclined with respect to the tire circumferential direction to different sides from each other, specifically, in FIG. 1 inclined to the left side and the right side in the plane of the paper relative to the tire equator line CL. In the form of the belt layers 6 illustrated in FIG. 1, the belt layer positioned on the inner side in the tire radial direction from among the two belt layers of the first cross belt layers 6a has a belt width in the tire width direction that is narrower compared with the belt layer positioned on the outer side in the tire radial direction. The belt layer positioned on the inner side in the tire radial direction from among the two belt layers of the second cross belt layers 6b has a belt width in the tire width direction that is wider compared with the belt layer positioned on the outer side in the tire radial direction. The belt layer positioned on the inner side in the tire radial direction from among the two belt layers of the third cross belt layers 6c has a belt width in the tire width direction that is wider compared with the belt layer positioned on the outer side in the tire radial direction. There is no particular limitation on the belt width, and the form of the belt widths illustrated in FIG. 1 is an example. Also, the belt layers 6 are configured from three sets of cross belt layers, but there is no particular limitation on the belt layer configuration of the belt layers 6, and it may be configured from two sets of cross belt layers, the first cross belt layers 6a and the second cross belt layers 6b. Also, a sheet-like rubber layer may be provided partially between the belt layers of the second cross belt layers 6b.

Preferably, among the reinforcing cords of each of the belt layers of the first cross belt layers 6a, the minimum inclination angle with respect to the tire circumferential direction of the belt cords is 20 to 24°, in order to minimize deformation of the belt layer resulting in expansion in the tire radial direction by obtaining the so-called hoop effect. Preferably, among the reinforcing cords of each of the belt layers of the second cross belt layers 6b, the minimum inclination angle with respect to the tire circumferential direction of the belt cords is 16 to 20°, in order to obtain the hoop effect. Also, preferably, among the reinforcing cords of each of the belt layers of the third cross belt layers 6c, the minimum inclination angle with respect to the tire circumferential direction of the belt cords is 22 to 26°. Preferably, the inclination angles of the reinforcing cords of each of the belts of the first cross belt layers 16a is larger compared with the inclination angles in the second cross belt layers 6b.

This configuration of the tire 1 is just an example, and the tire 1 may be provided with another commonly known configuration.

Tread Pattern

Figure 2:
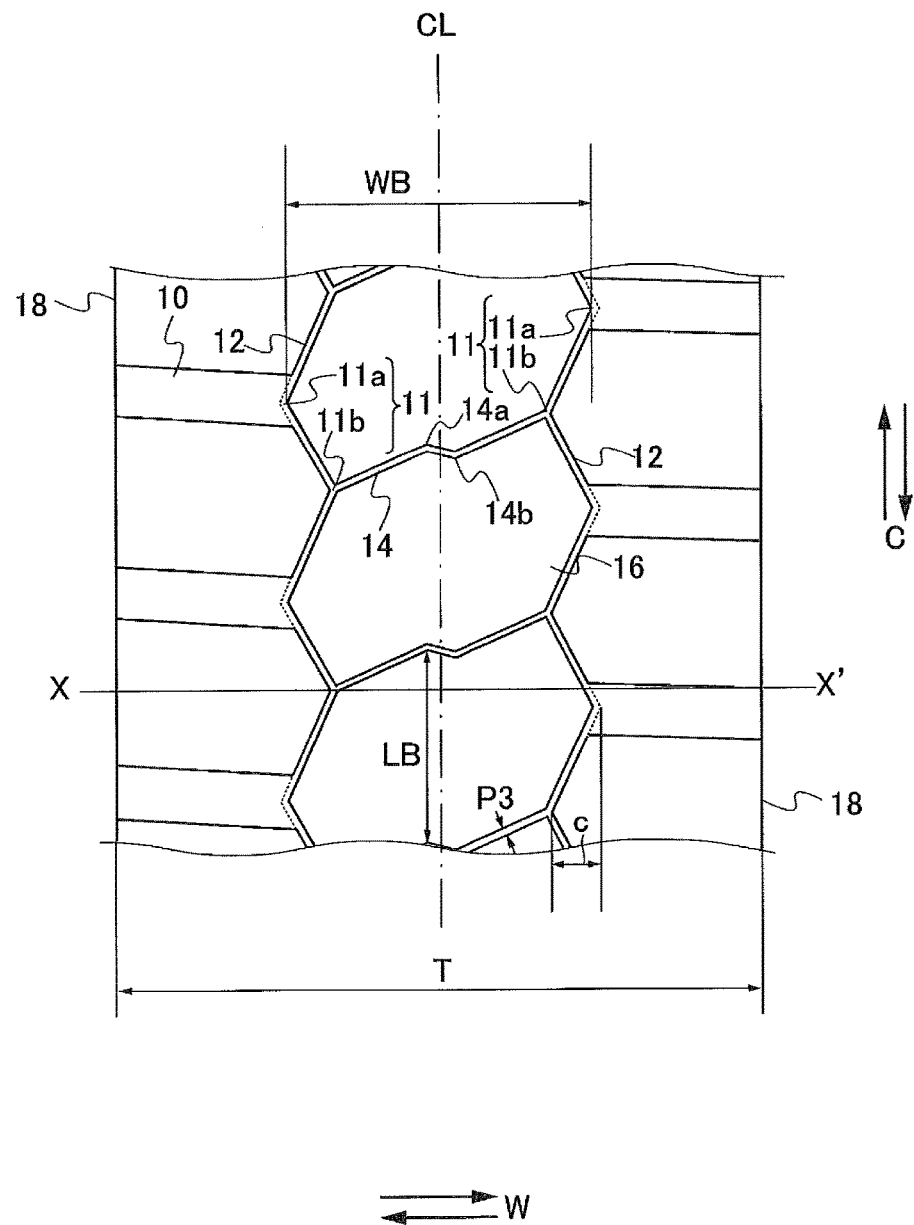
FIG. 2 is a plan development view of a tread pattern of the tire of the present embodiment.

FIG. 2 is a planar development diagram illustrating the tread pattern provided on the tread portion 2 of the tire 1. In FIG. 2, the tire circumferential direction is indicated by C, and the tire width direction is indicated by W.

The tread portion 2 includes shoulder lug grooves 10, a pair of circumferential primary grooves 12, center lug grooves 14, and center blocks 16 as the tread pattern.

The shoulder lug grooves 10 are provided at intervals in the tire circumferential direction in half-tread regions on both a first side (the left side in the plane of the paper in FIG. 1) and a second side (the right side in the plane of the paper in FIG. 1) in the tire width direction relative to the tire equator line CL. The shoulder lug grooves 10 extend to the outer side in the tire width direction in the half-tread regions on both sides in the tire width direction relative to the tire equator line CL, and their ends on the outer side in the tire width direction are open to the tread ends (ground contact edges) 18 on both sides in the tire width direction. As illustrated in FIG. 1, the tread ends 18 are the parts where the external forms of the tread portion 2 and the side portions 3 connect, and if these connection parts are rounded, the tread ends 18 are the points of intersection of the extension line when the external form of the tread portion 2 is extended conforming to this shape, and the extension line when the external form of the side portion 3 is extended conforming to this shape.

In the shoulder lug grooves 10 positioned on both sides in the tire width direction, the position in the tire circumferential direction of one shoulder lug grooves 10 on one of the half-tread regions is between the positions in the tire circumferential direction of two adjacent shoulder lug grooves in the other half-tread region.

In addition, the position in the tire width direction of the ends of the shoulder lug grooves 10 on the inner side in the tire width direction in each of the half-tread regions is on the outer side in the tire width direction compared with the ends of the center lug grooves 14 that are described later. Also in the tire circumferential direction, there is one shoulder lug groove 10 provided in the shoulder regions between adjacent center lug grooves 14 that are adjacent to each other in the tire circumferential direction from among the center lug grooves 14. In this way, the circumferential primary grooves 12 that are described later are formed in a wave-like shape connected alternately to the ends of the center lug grooves 14 and the ends on the inner side in the tire width direction of the shoulder lug grooves 10.

The pair of circumferential primary grooves 12 is provided in the half-tread regions on the first side and the second side in the tire width direction relative to the tire equator line CL. Each of the circumferential primary grooves 12 is formed in a wave-like shape around the entire periphery of the tire alternately connecting the ends of the center lug grooves 14 as described later, and the ends on the inner side in the tire width direction of the shoulder lug grooves 10, in their respective half-tread regions. The groove width of the pair of circumferential primary grooves 12 is narrower than the groove width of the shoulder lug grooves 10. The groove having a wave-like shape means the groove has a meandering shape, and a primary groove turning portion that is bent in a convex shape with respect to the outer side or the inner side in the tire width direction forming the wave-like shape of the groove may be an angled shape or it may be a rounded curved shape. Curved shape includes a shape in which the corner portion of the rubber block in contact with the corner portion of the groove is rounded as determined by a radius of curvature, in other words, includes grooves with the curved shape formed by chamfering the corner portion of the rubber block. Also, the portions other than the primary groove turning portions described above may be a linear shape or may be a curved shape. When the primary groove turning portions and the portions other than the primary groove turning portions are formed in a curved shape, the two curved shapes may be curved shapes with the same radius of curvature. Also, among pairs of convex turning portions that are adjacent to each other in the tire circumferential direction, one may be a bent shape primary groove turning portion formed by connecting a straight line shaped and a curved shaped groove, and the other may be a curved shape primary groove turning portion.

Specifically, the circumferential primary grooves 12 have a plurality of primary groove turning portions 11 on the entire periphery bent to form protrusions to the outer side and the inner side in the tire width direction, and that extend in the tire circumferential direction while meandering in a wave-like shape in the tire width direction. Each of the pair of circumferential primary grooves 12 connects with the shoulder lug grooves 10 at third groove turning portions 11a that are bent in a protruding shape to the outer side in the tire width direction, from among the primary groove turning portions 11. Also, each of the pair of circumferential primary grooves 12 connect with the center lug grooves 14 at fourth groove turning portions 11b that are bent in a protruding shape to the inner side in the tire width direction, from among the primary groove turning portions 11. The positions in the tire circumferential direction of the fourth groove turning portions 11b are shifted with respect to the positions of the fourth groove turning portions 11b of the half-tread region on the opposite side. Therefore, the center lug grooves 14 extend in a direction that is inclined with respect to the tire width direction.

The center lug grooves 14 are provided in plurality at intervals in the tire circumferential direction. The center lug grooves 14 extend across the tire equator line CL and have one end in each of the half-tread regions on the two sides in the tire width direction of the tire equator line CL (the first side and the second side). The two ends of the center lug grooves 14 are connected to fourth groove turning portions 11b of each of the pair of circumferential primary grooves 12. The center lug grooves 14 intersect the tire equator line CL. Note that the wave-like shape of each of the pair of circumferential primary grooves 12 is a wave-like shape having a predetermined wavelength, and the phases in the tire circumferential direction of these two wave-like shapes are shifted by approximately half a pitch relative to each other. In other words, the position in the tire circumferential direction of the third groove turning portions 11a on one of the pair of circumferential primary grooves 12 is between the positions in the tire circumferential direction of third groove turning portions 11a that are adjacent to each other in the tire circumferential direction of the other circumferential primary groove 12. The third groove turning portions 11a of one of the pair of circumferential primary grooves 12 are provided at substantially the same positions in the tire circumferential direction as the fourth groove turning portions 11b of the other circumferential primary groove 12.

Figure 3:
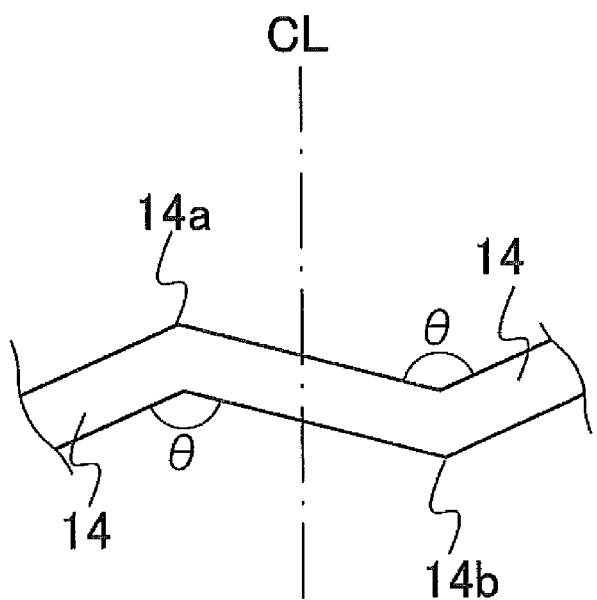
FIG. 3 is an enlarged view of the center lug groove provided in the tire of the present embodiment.

A first groove turning portion 14a and a second groove turning portion 14b with a bent shape are provided on the center lug grooves 14. FIG. 3 is an enlarged view of the bent shape of the first groove turning portion 14a and the second groove turning portion 14b of the center lug groove 14. Note that in the present embodiment, the first groove turning portion 14a and the second groove turning portion 14b have a bent shape, but it may be a curved shape. Curved shape includes a shape in which the corner portion of the rubber block in contact with the corner portion of the groove is rounded as determined by a radius of curvature, in other words, includes grooves with the curved shape formed by chamfering the corner portion of the rubber block.

By having the first groove turning portion 14a and the second groove turning portion 14b, the center lug grooves 14 are displaced in the tire circumferential direction in a wave-like shape. The shape of the first groove turning portion 14a and the second groove turning portion 14b, for example, the bend angle θ (see FIG. 3) of the center lug groove 14 formed by the first groove turning portion 14a and the second groove turning portion 14b, is an obtuse angle. Preferably, the first groove turning portion 14a and the second groove turning portion 14b are provided at positions at the same distance from the tire equator line CL, on the two sides in the tire width direction of the tire equator line CL. The portion of the center lug groove 14 between the first groove turning portion 14a and the second groove turning portion 14b is provided so that it passes through the tire equator line CL. Also the orientation of the inclination of the center lug groove 14 with respect to the tire width direction in this portion is different from that of the portions other than this portion.

The center lug groove 14 according to this embodiment has a configuration that includes straight-line portions that extend in a linear manner and the first groove turning portion 14a and the second groove turning portion 14b, but curved grooves may be used instead of the straight line portions described above. Also, one of the first groove turning portion 14a and the second groove turning portion 14b may have a bent shaped and the other may have a curved shape. If the first groove turning portion 14a and the second groove turning portion 14b have a curved shape and a curved groove is used instead of the straight-line portions, the two curved shapes may be curved shapes having the same radius of curvature. Also, among the first groove turning portion 14a and the second groove turning portion 14b, one may be a groove turning portion with a bent shape formed by connecting a linear shaped and a curved shaped groove, and the other may be a groove turning portion with a curved shape. The shape of the center lug groove 14 may be a groove shape that extends in the tire width direction while being displaced in the tire circumferential direction in a wave-like shape.

Figure 4:
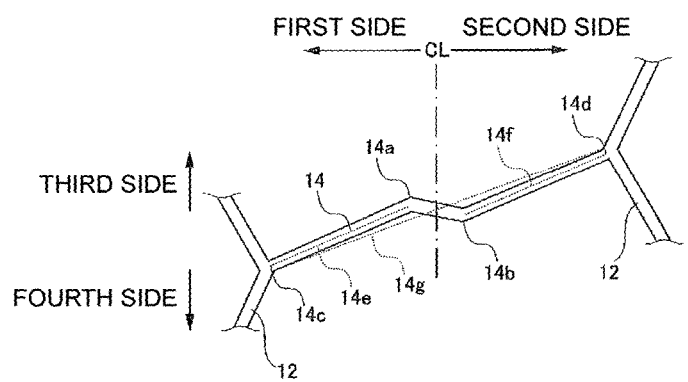
FIG. 4 is an explanatory view of an example of the form of the center lug grooves in the tread pattern of the present embodiment.

FIG. 4 is an explanatory view illustrating an example of a preferred shape of the center lug groove 14 that defines the shape of the center block 14.

As illustrated in FIG. 4, the first groove turning portion 14a of the center lug groove 14 is bent or curved so as to protrude towards a third side (the upper side in the plane of the paper in FIG. 4) in the tire circumferential direction on the first side (the left side in the plane of the paper in FIG. 4) with respect to the tire equator line CL. The second groove turning portion 14b of the center lug groove 14 is bent or curved so as to protrude towards a fourth side (the lower side in the plane of the paper in FIG. 4) in the tire circumferential direction on the second side (the right side in the plane of the paper in FIG. 4) with respect to the tire equator line CL. The fourth side is the opposite side to the third side. Here, a first connection end portion 14c at which the center lug groove 14 is connected to the circumferential primary groove 12 on the first side and a second connection end portion 14d at which the center lug groove 14 is connected to the circumferential primary groove 12 on the second side correspond to the tips on the inner side in the tire width direction of the circumferential primary grooves 12, in other words, the fourth groove turning portions 11b, 11b. The center lug groove 14 is inclined with respect to the tire width direction, so the second connection end portion 14d of the center lug groove 14 is on the third side (the upper side in the plane of the paper in FIG. 3) in the tire circumferential direction of the first connection end portion 14c.

At this time, preferably, the center positions in the groove width direction of the center lug grooves 14 are arranged so that the inclination angle with respect to the tire width direction of a first straight line 14e that connects the protruding end of the first groove turning portion 14a that protrudes to the third side (the upper side in FIG. 3) in the tire circumferential direction and the first connection end portion 14c (an inclination angle larger than 0° and smaller than 90°), and, the inclination angle with respect to the tire width direction of a second straight line 14f that connects the protruding end of the second groove turning portion 14b that protrudes to the fourth side in the tire circumferential direction and the second connection end portion 14d (an inclination angle larger than 0° and smaller than 90°), are larger than the inclination angle with respect to the tire width direction of a third straight line 14 g that connects the first connection end portion 14c and the second connection end portion 14d (an inclination angle larger than 0° and smaller than 90°).

In a preferred form of the present embodiment, as illustrated in FIGS. 2 and 4, the center positions in the groove width direction of the center lug grooves 14 are arranged so that the portion of the center lug groove 14 between the protruding end of the first groove turning portion 14a that protrudes to the third side in the tire circumferential direction and the first connecting end portion 14c is on the first straight line 14e, or on the third side with respect to the first straight line 14e, and the portion of the center lug groove 14 between the protruding end of the second groove turning portion 14b that protrudes to the fourth side in the tire circumferential direction and the second connecting end portion 14d is on the second straight line 14f, or on the fourth side with respect to the second straight line 14f.

By forming the center block 16 in this way, the tread stiffness of the center block 16 can be increased. In other words, the center block 16 has an anisotropic shape with the shape determined by the center lug grooves 14 that are inclined in one direction with respect to the tire width direction, so when the center blocks 16 kick away from the tire ground contact surface to separate from the road surface, and the center blocks 16 deform in torsion rotating clockwise or counterclockwise. At this time, the groove width of the circumferential primary groove 12 is narrow, so the center block 16 meshes with the shoulder blocks that are adjacent in the tire width direction sandwiching the circumferential grooves 12 at the third groove turning portions 11a and the fourth groove turning portions 11b so that they function as a unit. In addition, center blocks 16 that are adjacent to each other in the tire circumferential direction sandwiching the center lug grooves 14 mesh with each other at the first groove turning portion 14a and the second groove turning portion 14b so that they function as a unit. Therefore, the tread stiffness of the center blocks 16 can be increased. By increasing the tread stiffness of the center blocks 16, torsion of the center blocks 16 can be reduced, and wear at local regions of the center blocks 16 on both sides of the center lug grooves 14 in the tire circumferential direction can be reduced.

In addition, when the center block 16 kicks away from the road surface, each portion of the center blocks 16 is subjected to a shear force from the road surface in the tire circumferential direction, so they tend to deform and collapse inward. At this time, because the first groove turning portion 14a and the second groove turning portion 14b are provided on the center lug grooves 14, the land portions around the first groove turning portion 14a and the second groove turning portion 14b mesh with each other, and two blocks that are adjacent to each other in the tire circumferential direction mesh with each other and function as one block to generate a reaction force. Therefore, by providing the first groove turning portion 14a and the second groove turning portion 14b in the center lug grooves 14, the tread stiffness of the center blocks can be increased. By increasing the tread stiffness of the center blocks 16, collapsing inwards of the center blocks 16 can be reduced, so wear at local regions of the center blocks 16 on both sides of the center lug grooves 14 in the tire circumferential direction can be reduced.

A plurality of the center blocks 16 is formed in a row in the tire circumferential direction partitioned by the center lug grooves 14 and the pair of circumferential primary grooves 12. The tire equator line (tire center line) CL passes through the center blocks 16.

Here, the block width WB of the center block 16 in the tire width direction (see FIG. 2), the belt width W1 of the belt layer with the shortest belt width in the tire width direction from among the first cross belt layers 6a (see FIG. 1), and the belt width W2 of the belt layer with the shortest belt width in the tire width direction from among the second cross belt layers 6b (see FIG. 1) satisfy the ratio WB/W1 in the range from 0.6 to 0.9, the ratio WB/W2 in the range from 0.9 to 1.2, and W1 greater than W2.

In this way, because the groove width of the circumferential primary grooves 12 in the tread pattern of the present embodiment is narrower than the groove width of the shoulder lug grooves 10, the maximum width WB of the center blocks 16 can be increased compared with conventionally. Therefore, the traction performance due to the center block 16 can be enhanced. Also, the belt width or the center block 16 maximum width is defined so that the relationship between the belt width and the center block 16 maximum width is as described above, so the enveloping property of the center blocks 16 to envelop the undulations on the road surface is significant. Therefore, the cut resistance of the tread block 16 is improved. In addition, preferably, the ratio WB/W1 is from 0.65 to 0.85, and the ratio WB/W2 is from 0.95 to 1.15 in order to most effectively exhibit the enveloping property of the center block 16 region and improve the cut resistance. When the widths W1 and W2 are too wide relative to the maximum width WB, the enveloping property in the center block 16 region cannot be sufficiently obtained, and when the widths W1 and W2 are too narrow relative to the maximum width WB, the block stiffness of the center blocks 16 is reduced, and wear of the center blocks 16 and heel and toe wear can easily occur.

Also, in the tread pattern of the tire 1, the circumferential primary grooves 12 have a wave-like shape, so it is possible to disperse the stresses generated by the undulations in the road surface by the edges of the center blocks 16, and it becomes difficult for cuts to be caused at these edge portions.

Figure 5:
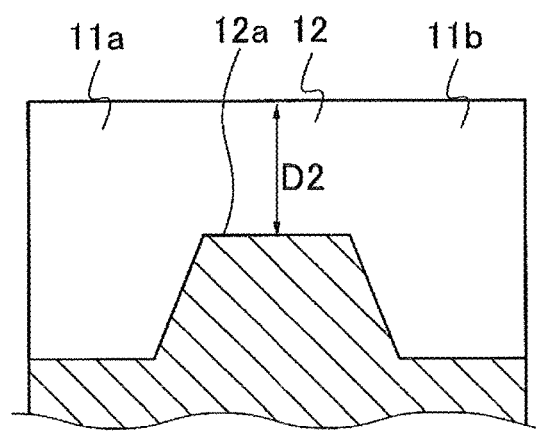
FIG. 5 illustrates an example of the raised bottom portion in the circumferential primary grooves provided in the tire of the present embodiment.

Also, as a preferred form of the tread pattern, in each of the pair of circumferential primary grooves 12, preferably a raised bottom portion 12a is provided where the groove depth is made shallower partially. FIG. 5 illustrates an example of raised bottom portion 12a. By providing the raised bottom portion 12a in the circumferential primary grooves 12, it is possible to ensure the thread stiffness of the center block 16 over a specific area and reduce collapsing in of the center blocks 16, which is effective for the traction performance. In addition, collapsing in of the center block 16 is reduced, so wear around the edges of the blocks can be reduced. As illustrated in FIG. 5, the raised bottom portion 12a is provided in a portion between the third groove turning portions 11a and the fourth groove turning portions 11b that extend at an inclination to the tire circumferential direction, but it may also be provided in the circumferential primary grooves 12 in the region of the third groove turning portions 11a and the fourth groove turning portions 11b. The circumferential primary grooves 12 include a maximum depth region where the groove depth is a constant maximum depth, and the raised bottom portion 12a is a portion where the groove depth is shallower than this region. Note that preferably the maximum groove depth of the circumferential primary grooves 12 is the same as the groove depth of the shoulder lug grooves 10.

The form of the raised bottom portion 12a may be a form in which the groove depth becomes shallower than the maximum depth region with a step, or it may be a form in which the groove depth becomes gradually shallower from the maximum depth region, or it may be a form in which after the groove depth becomes shallow, the groove depth become shallower within the region where the groove depth is shallower than that of the maximum depth region. In this way, the raised bottom portion 12a may have a constant shallow groove depth, but a constant shallow groove depth is not necessary, and the groove depth may fluctuate.

At this time, preferably the ratio D2/T of the groove depth D2 of the shallowest portion of the raised bottom portion 12a (see FIG. 5) and the thread width T in the tire width direction of the tread portion (see FIG. 2) is less than 0.05. When the ratio D2/T is equal to or greater than 0.05, the groove depth of the raised bottom portion 12a becomes deep in comparison with the thread width T, so it becomes difficult to reduce the collapsing in of the blocks of the center blocks 16. More preferably, the ratio D2/T is not more than 0.04, for example, 0.03. There is no particular lower limit of the ratio D2/T, but for example, it may be 0.01. Also, if the ratio D2/T is equal to or greater than 0.05, the groove depth of the raised bottom portion 12a becomes deep compared with the tread width T, so the difference between the block stiffness of the center block 16 around the raised bottom portion and the block stiffness of the center portion (portion on the inside separated from the edge of the groove having the raised portion) of the center block 16 becomes large, and uneven wear can easily occur. The tread width T refers to the periphery length along the external shape of the curved tread portion 2 between the tread ends 18 on both sides in the tire width direction.

Also, preferably the ratio WB/T between the thread width T in the tire width direction of the tread portion 2 and the block with WB of the center block is from 0.35 to 0.55, from the point of view of making the enveloping properties in the center block 16 appropriate, and enhancing the cut resistance. More preferably, the ratio WB/T is from 0.4 to 0.5. If the block width WB is reduced and the ratio WB/T is less than 0.35, the block stiffness of the center block 16 becomes smaller, and the wear resistance deteriorates. If the block width WB is increased and the ratio WB/T is greater than 0.5, the enveloping property deteriorates.

In addition, as illustrated in FIG. 1, providing the pair of third cross belt layers 6c in which the orientation of the belt cords with respect to the tire circumferential direction are different to each other and inclined to the first side and the second side, on the outer side in the tire radial direction of the second cross belt layers 6b of the belt layers (belt portion) 6 ensures the appropriateness of the enveloping property of the center blocks 16, and improves the cut resistance of the center blocks 16. Preferably, the ratio WB/W3 for the belt width W3 of the belt layer having the shortest belt width in the tire width direction from among the third cross belt layers 6c (see FIG. 1) is from 0.5 to 0.8, and W3 is greater than W1, from the point of view of ensuring that the enveloping property of the center block 16 is within a specific range, and improving the cut resistance of the center blocks 16. If the belt width W3 is increased and the ratio WB/W3 is less than 0.5, it is not possible to ensure that the enveloping property of the center block 16 is within the specific range. On the other hand, if the belt width W3 is reduced and the ratio WB/W3 is greater than 0.8, the cut resistance is reduced. Preferably, the ratio WB/W3 is from 0.55 to 0.75.

Preferably, the regions that include the wave-like shaped third groove turning portions 11a and the regions that include the fourth groove turning portions 11b in each of the circumferential primary grooves 12 each have the edge cross-section of the groove wall on the center block 16 side being rounded with a circular arc shape. In this way, the shear force applied to the edge of the groove wall from the road surface is not concentrated, so it becomes difficult for a cut to start in the center block 16, and the cut resistance is enhanced.

Preferably, the center lug groove 14 includes the first groove turning portion 14a and the second groove turning portion 14b with a bent shape or a curved shape, and the edge cross-section of the groove wall is rounded with a circular arc shape in the region that includes the first groove turning portion 14a and the second groove turning portion 14b. In this way, the shear force applied to the edge of the groove wall from the road surface is not concentrated, so it becomes difficult for a cut to start in the center block 16, and the cut resistance is enhanced.

Preferably, the corners in contact with the circumferential primary grooves 12 are all obtuse angle corner portions, from the point of view of reducing collapsing of the center block 16 when the corner portions are subjected to braking forces, driving forces, or lateral forces, so that the corner portions do not become the nucleus for generation of wear.

Also, preferably, the groove width of the pair of circumferential primary grooves 12 and the center lug grooves 14 are each from 7 to 20 mm, from the point of view of providing the edge component of the center blocks 16 that is necessary for the traction performance, and reducing localized wear which can easily occur around the circumferential primary grooves 12 and the center lug grooves 14.

Preferably, the tire 1 is fitted to a construction vehicle or an industrial vehicle. Construction vehicles and industrial vehicles include dump trucks, scrapers, graders, shovel loaders, tire loaders, wheeled cranes, tracked cranes, compactors, earthmovers, graders, loaders, bulldozers, and so on.

In this way, in the tire according to the present embodiment, the block width WB of the center block 16 in the tire width direction, the belt width W1 of the belt layer with the shortest belt width in the tire width direction from among the first cross belt layers 6a, and the belt width W2 of the belt layer with the shortest belt width in the tire width direction from among the second cross belt layers 6b satisfy the ratio WB/W1 in the range from 0.6 to 0.9, the ratio WB/W2 in the range from 0.9 to 1.2, and W1 greater than W2. As a result, the enveloping property of the center blocks 16 can be ensured over a specific range, and the cut resistance can be enhanced.

Figure 6:
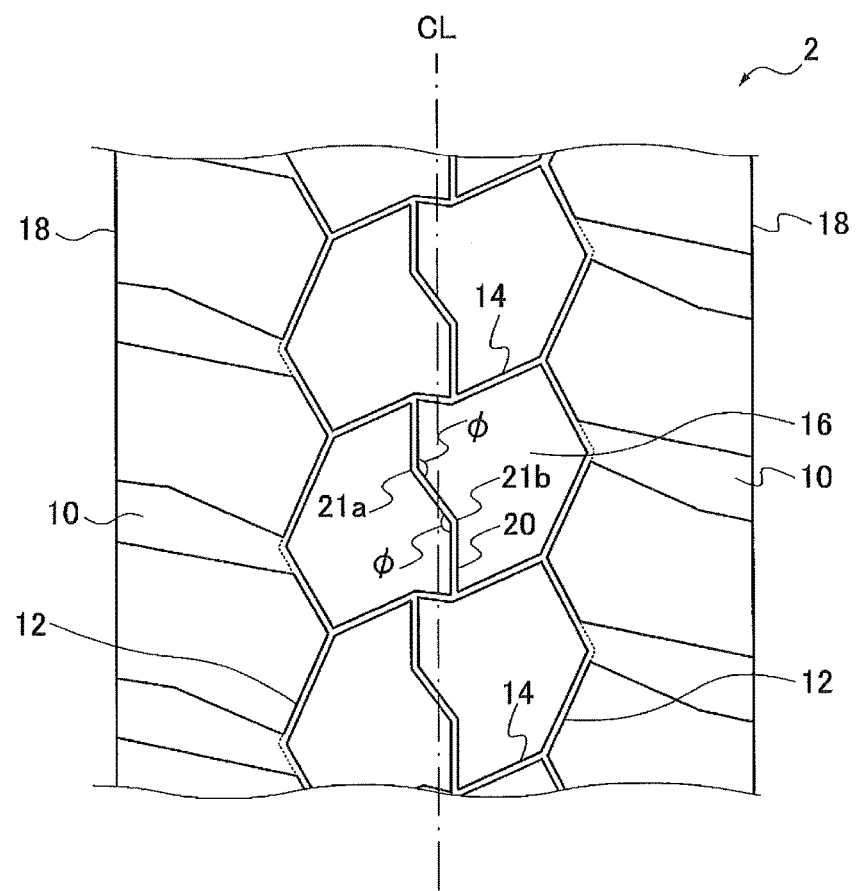
FIG. 6 illustrates a modified example of the tread pattern in the present embodiment.

In addition, circumferential secondary grooves 20 with a groove depth shallower compared with the maximum groove depth of the circumferential primary grooves 12 may be provided between adjacent center lug grooves 14 in the tire circumferential direction in the center blocks 16, as illustrated in FIG. 6. FIG. 6 illustrates a modified example of the tread pattern of the present embodiment. As illustrated in FIG. 5, the circumferential secondary grooves 20 include straight line portions extending from the center lug grooves 14 parallel to the tire circumferential direction, a bent shaped fifth groove turning portion 21a and a sixth groove turning portion 21b connected to the straight line portions, and an inclined portion inclined with respect to the tire circumferential direction extending between the fifth groove turning portion 21a and the sixth groove turning portion 21b. A illustrated in FIG. 6, the shape of the fifth groove turning portion 21a and the sixth groove turning portion 21b provided in the circumferential secondary grooves 20 is a shape such that the bend angle φ (see FIG. 6) of the circumferential secondary grooves 20 created by the fifth groove turning portion 21a and the sixth groove turning portion 21b is an acute angle. In the circumferential secondary groove 20 illustrated in FIG. 6, the fifth groove turning portion 21a and the sixth groove turning portion 21b are provided, but there may be one, or there may be three or more. In this case, the straight line portion in the circumferential secondary grooves 20 need not extend parallel to the tire circumferential direction. Also, as illustrated in FIG. 6, in the circumferential secondary grooves 20, preferably, the portion that connects the fifth groove turning portion 21a and the sixth groove turning portion 21b passes over the tire equator line CL.

Note that, besides a bent shape, the shape of the fifth groove turning portion 21a and the sixth groove turning portion 21b may be a curved shape. A curved shape includes a shape in which the corner portion of the rubber block in contact with the corner portion of the groove is rounded as determined by a radius of curvature, in other words, includes grooves with the curved shape formed by chamfering the corner portion of the rubber block. Also, one of the fifth groove turning portion 21a and the sixth groove turning portion 21b may have a bent shape and the other may have a curved shape.

The straight line portion of the circumferential secondary grooves 20 as described above has a groove formed extending parallel to the tire circumferential direction, but instead of this groove form the straight line portion may be changed to a curved shape. If the fifth groove turning portion 21a and the sixth groove turning portion 21b have a curved shape and a curved shape is used instead of the straight-line portion described above, the two curved shapes may be curved shapes having the same radius of curvature. Also, among the second groove turning portions 21, one may be a groove turning portion with a bent shape formed by connecting a linear shaped and a curved shaped groove, and the other may be a groove turning portion with a curved shape. Also, as described above, the circumferential secondary grooves 20 include the straight line portion, the fifth groove turning portion 21a and the sixth groove turning portion 21b, and the inclined portion, but a groove shape extending in the tire circumferential direction while being displaced in the tire circumferential direction in a wave-like form may be used instead.

Working Examples, Conventional Example, Comparative Examples

In order to investigate the effect of the tire according to the present embodiment, various tires having different belt widths and tread patterns were produced, and the cut resistance of the center block was investigated. The tires produced were 46/90R57. Center block cut resistance tests were carried out by fitting the tires to a rim size 29.00-6.0 (TRA specified rim), and running for 5000 hours on the same off-road surface using a 200 ton dump truck under test conditions 700 kPa (TRA prescribed air pressure), and imposed load 617.81 kN (TRA prescribed load).

For the cut resistance, the number of tread defects equal to or greater than a predetermined size in the center blocks was counted after running for 5000 hours. Then, taking the number counted for the Conventional Example that is described later as a reference (index 100), the results were expressed as an index so that the greater the index the fewer the number counted on the Working Examples and Comparative Examples (the better the cut resistance).

The tires produced included a Conventional Example, Working Examples 1 to 34, and Comparative Examples 1 to 10.

Figure 7:
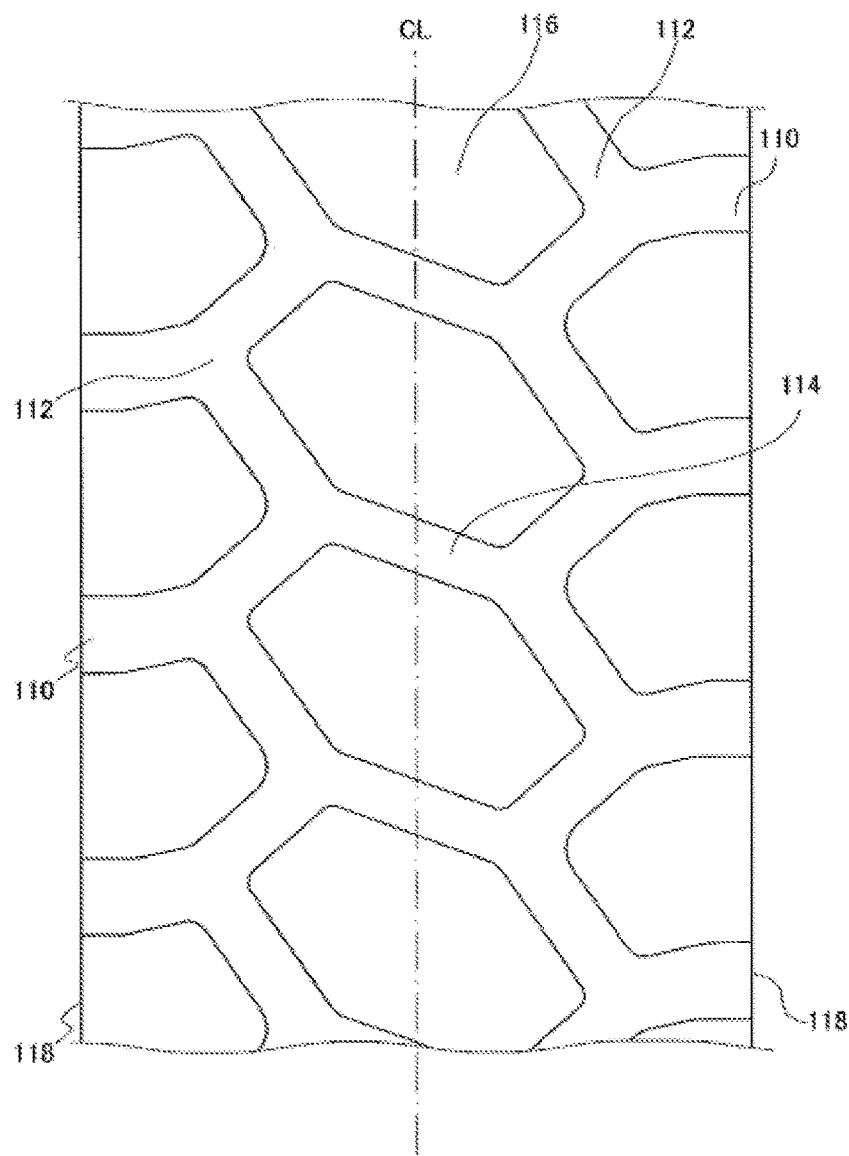
FIG. 7 illustrates the tread pattern of a pneumatic tire of a conventional example.

FIG. 7 illustrates the tread pattern of the Conventional Example. The tread pattern illustrated in FIG. 7 includes shoulder lug grooves 110, a pair of circumferential primary grooves 112, center lug grooves 114, and center blocks 116. The shoulder lug grooves 110, the pair of circumferential primary grooves 112, the center lug grooves 114, and the center blocks 116 have the same configuration as the shoulder lug grooves 10, the pair of circumferential primary grooves 12, the center lug groove 14, and the center blocks 16, but the groove width of the shoulder lug grooves 110 and the groove width of the circumferential primary grooves 112 are the same as the groove width of the shoulder lug grooves 10. Because the groove width of the circumferential primary grooves 112 is the same as that of the shoulder lug grooves 110, the circumferential primary grooves were not narrower than the groove width of the shoulder lug grooves 10, as with the circumferential primary grooves 12, so in the following Table 1, there are no circumferential primary grooves with a wave-like shape.

Working Examples 1 to 33 and Comparative Examples 1 to 10 had the tread pattern illustrated in FIG. 2.

Working Example 34 was the same as Working Example 3 except in the tread pattern illustrated in FIG. 2, the first groove turning portion 14a and the second groove turning portion 14b of the center lug groove 14 were not provided, so straight line shaped inclined lug grooves that were inclined with respect to the tire width direction were provided between the circumferential primary grooves 12 instead of the center lug grooves 14.

The following Tables 1 to 6 show each element of the tread patterns and the corresponding evaluation results for the cut resistance.

Table 1 shows the tread pattern specifications and evaluation results for the tires that did not comply with the present embodiment.

Table 2 shows the evaluation results for tread patterns (Working Examples 1 to 5, Comparative Examples 7 and 8) having the circumferential primary grooves 12, with the ratio WB/W2 fixed, and various changes made to the ratio WB/W1. Table 3 shows the evaluation results for tread patterns (Working Examples 6 to 9, Comparative Examples 9 and 10) having the ratio WB/W1 fixed in accordance with Working Example 3 in Table 1, and various changes made to the ratio WB/W2.

Table 4 shows the evaluation results for tread patterns (Working Example 3, Working Example 10) with and without raised bottom portions in the circumferential primary grooves, the evaluation results for tread patterns (Working Examples 10 to 12) in which the ratio WB/W1 and the ratio WB/W2 were fixed and various changes were made to the ratio D2/T, and the tread patterns (Working Examples 13 to 19) in which the ratio WB/W1, the ratio WB/W2, and the ratio D2/T were fixed, and various changes were made to the ratio WB/T. Table 5 shows the evaluation results for tread patterns (Working Examples 20 to 27) in which the ratio WB/W1 and the ratio WB/W2 were fixed and various changes were made to the ratio WB/W3, and the evaluation results for tread patterns (Working Example 23, Working Example 27) in which the groove wall edge cross-sections of the apexes of the center blocks were with or without a circular arc shape. Table 6 shows the evaluation results for tires (Working Examples 28 to 30) in which the ratio WB/W1 and the ratio WB/W2 were fixed, and various changes were made to the inclination angle of the belt cords of the first cross belt layers 6a (both belts were inclined with respect to the tire circumferential direction with opposite orientations but the same inclination angle), and the evaluation results for tires (Working Examples 31 to 33) in which the ratio WB/W1 and the ratio WB/W2 were fixed, and various changes were made to the inclination angle of the belt cords of second cross belt layers 6b (both belts were inclined with respect to the tire circumferential direction with different orientation but the same inclination angle). Table 7 shows the evaluation results for tread pattern (Working Example 34) in which linear inclined lug grooves in which the first groove turning portion 14a and the second groove turning portion 14b of the center lug grooves 14 were not provided were used instead of the center lug grooves 14, but otherwise the specification was the same as that of Working Example 3.

TABLE 1

|  | Conventional Example | Comparative Example 1 | Comparative Example 2 | Comparative Example 3 |
|---|---|---|---|---|
| Circumferential primary grooves with wave-like shape | Absence | Presence | Presence | Presence |
| WB/W1 | 0.5 | 0.5 | 1.0 | 0.5 |
| WB/W2 | 0.8 | 0.8 | 1.3 | 1.3 |
| Raised bottom portions of circumferential primary grooves | Absence | Absence | Absence | Absence |
| D2/T | — | — | — | — |
| WB/T | 0.6 | 0.6 | 0.6 | 0.6 |
| WB/W3 | 0.4 | 0.4 | 0.4 | 0.4 |
| Circular arc shape on edge cross-section of groove wall of apexes of the center block or not | No | No | No | No |
| Cord inclination angle of first cross belt layers | 26 | 26 | 26 | 26 |
| Cord inclination angle of second cross belt layers | 22 | 22 | 22 | 22 |
| Cut resistance | 100 | 101 | 101 | 101 |

|  | Conventional Example | Comparative Example 4 | Comparative Example 5 | Comparative Example 6 |
|---|---|---|---|---|
| Circumferential primary grooves with wave-like shape | Absence | Presence | Presence | Presence |
| WB/W1 | 0.5 | 1.0 | 0.8 | 0.5 |
| WB/W2 | 0.8 | 0.8 | 0.8 | 1.0 |
| Raised bottom portions of circumferential primary grooves | Absence | Absence | Absence | Absence |
| D2/T | — | — | — | — |
| WB/T | 0.6 | 0.6 | 0.6 | 0.6 |
| WB/W3 | 0.4 | 0.4 | 0.4 | 0.4 |
| Circular arc shape on edge cross-section of groove wall of apexes of the center block or not | No | No | No | No |
| Cord inclination angle of first cross belt layers | 26 | 26 | 26 | 26 |
| Cord inclination angle of second cross belt layers | 22 | 22 | 22 | 22 |
| Cut resistance | 100 | 101 | 102 | 102 |

TABLE 2

|  | Comparative Example 7 | Working Example 1 | Working Example 2 | Working Example 3 |
|---|---|---|---|---|
| Circumferential primary grooves with wave-like shape | Presence | Presence | Presence | Presence |
| WB/W1 | 0.5 | 0.6 | 0.65 | 0.75 |
| WB/W2 | 1.05 | 1.05 | 1.05 | 1.05 |
| Raised bottom portions of circumferential primary grooves | Absence | Absence | Absence | Absence |
| D2/T | — | — | — | — |
| WB/T | 0.6 | 0.6 | 0.6 | 0.6 |
| WB/W3 | 0.4 | 0.4 | 0.4 | 0.4 |
| Circular arc shape on edge cross-section of groove wall of apexes of the center block are not | No | No | No | No |
| Cord inclination angle of first cross belt layers | 26 | 26 | 26 | 26 |
| Cord inclination angle of second cross belt layers | 22 | 22 | 22 | 22 |
| Cut resistance | 102 | 108 | 109 | 110 |

|  | Working Example 4 | Working Example 5 | Comparative Example 8 |
|---|---|---|---|
| Circumferential primary grooves with wave-like shape | Presence | Presence | Presence |
| WB/W1 | 0.85 | 0.9 | 1.0 |
| WB/W2 | 1.05 | 1.05 | 1.05 |
| Raised bottom portions of circumferential primary grooves | Absence | Absence | Absence |
| D2/T | — | — | — |
| WB/T | 0.6 | 0.6 | 0.6 |
| WB/W3 | 0.4 | 0.4 | 0.4 |
| Circular arc shape on edge cross-section of groove wall of apexes of the center block are not | No | No | No |
| Cord inclination angle of first cross belt layers | 26 | 26 | 26 |
| Cord inclination angle of second cross belt layers | 22 | 22 | 22 |
| Cut resistance | 109 | 108 | 102 |

TABLE 3

|  | Comparative Example 9 | Working Example 6 | Working Example 7 |
|---|---|---|---|
| Circumferential primary grooves with wave-like shape | Presence | Presence | Presence |
| WB/W1 | 0.75 | 0.75 | 0.75 |
| WB/W2 | 0.8 | 0.9 | 0.95 |
| Raised bottom portions of circumferential primary grooves | Absence | Absence | Absence |
| D2/T | — | — | — |
| WB/T | 0.6 | 0.6 | 0.6 |
| WB/W3 | 0.4 | 0.4 | 0.4 |
| Circular arc shape on edge cross-section of groove wall of apexes of the center block or not | No | No | No |
| Cord inclination angle of first cross belt layers | 26 | 26 | 26 |
| Cord inclination angle of second cross belt layers | 22 | 22 | 22 |
| Cut resistance | 102 | 108 | 109 |

TABLE 3-continued

|  | Working Example 8 | Working Example 9 | Comparative Example 10 |
|---|---|---|---|
| Circumferential primary grooves with wave-like shape | Presence | Presence | Presence |
| WB/W1 | 0.75 | 0.75 | 0.75 |
| WB/W2 | 1.15 | 1.2 | 1.3 |
| Raised bottom portions of circumferential primary grooves | Absence | Absence | Absence |
| D2/T | — | — | — |
| WB/T | 0.6 | 0.6 | 0.6 |
| WB/W3 | 0.4 | 0.4 | 0.4 |
| Circular arc shape on edge cross-section of groove wall of apexes of the center block or not | No | No | No |
| Cord inclination angle of first cross belt layers | 26 | 26 | 26 |
| Cord inclination angle of second cross belt layers | 22 | 22 | 22 |
| Cut resistance | 109 | 108 | 102 |

TABLE 4

|  | Working Example 10 | Working Example 11 | Working Example 12 | Working Example 13 | Working Example 14 |
|---|---|---|---|---|---|
| Circumferential primary grooves with wave-like shape | Presence | Presence | Presence | Presence | Presence |
| WB/W1 | 0.75 | 0.75 | 0.75 | 0.75 | 0.75 |
| WB/W2 | 1.05 | 1.05 | 1.05 | 1.05 | 1.05 |
| Raised bottom portions of circumferential primary grooves | Presence | Presence | Presence | Presence | Presence |
| D2/T | 0.06 | 0.05 | 0.045 | 0.045 | 0.045 |
| WB/T | 0.6 | 0.6 | 0.6 | 0.3 | 0.35 |
| WB/W3 | 0.4 | 0.4 | 0.4 | 0.4 | 0.4 |
| Circular arc shape on edge cross-section of groove wall of apexes of the center block or not | No | No | No | No | No |
| Cord inclination angle of first cross belt layers | 26 | 26 | 26 | 26 | 26 |
| Cord inclination angle of second cross belt layers | 22 | 22 | 22 | 22 | 22 |
| Cut resistance | 110 | 110 | 112 | 112 | 113 |

|  | Working Example 15 | Working Example 16 | Working Example 17 | Working Example 18 | Working Example 19 |
|---|---|---|---|---|---|
| Circumferential primary grooves with wave-like shape | Presence | Presence | Presence | Presence | Presence |
| WB/W1 | 0.75 | 0.75 | 0.75 | 0.75 | 0.75 |
| WB/W2 | 1.05 | 1.05 | 1.05 | 1.05 | 1.05 |
| Raised bottom portions of circumferential primary grooves | Presence | Presence | Presence | Presence | Presence |
| D2/T | 0.045 | 0.045 | 0.045 | 0.045 | 0.045 |
| WB/T | 0.4 | 0.45 | 0.5 | 0.55 | 0.6 |
| WB/W3 | 0.4 | 0.4 | 0.4 | 0.4 | 0.4 |
| Circular arc shape on edge cross-section of groove wall of apexes of the center block or not | No | No | No | No | No |
| Cord inclination angle of first cross belt layers | 26 | 26 | 26 | 26 | 26 |
| Cord inclination angle of second cross belt layers | 22 | 22 | 22 | 22 | 22 |
| Cut resistance | 114 | 115 | 114 | 113 | 112 |

TABLE 5

|  | Working Example 20 | Working Example 21 | Working Example 22 | Working Example 23 |
|---|---|---|---|---|
| Circumferential primary grooves with wave-like shape | Presence | Presence | Presence | Presence |
| WB/W1 | 0.75 | 0.75 | 0.75 | 0.75 |
| WB/W2 | 1.05 | 1.05 | 1.05 | 1.05 |
| Raised bottom portions of circumferential primary grooves | Presence | Presence | Presence | Presence |
| D2/T | 0.045 | 0.045 | 0.045 | 0.045 |
| WB/T | 0.45 | 0.45 | 0.45 | 0.45 |
| WB/W3 | 0.4 | 0.5 | 0.55 | 0.65 |
| Circular arc shape on edge cross-section of groove wall of apexes of the center block or not | No | No | No | No |
| Cord inclination angle of first cross belt layers | 26 | 26 | 26 | 26 |
| Cord inclination angle of second cross belt layers | 22 | 22 | 22 | 22 |
| Cut resistance | 115 | 116 | 117 | 118 |

|  | Working Example 24 | Working Example 25 | Working Example 26 | Working Example 27 |
|---|---|---|---|---|
| Circumferential primary grooves with wave-like shape | Presence | Presence | Presence | Presence |
| WB/W1 | 0.75 | 0.75 | 0.75 | 0.75 |
| WB/W2 | 1.05 | 1.05 | 1.05 | 1.05 |
| Raised bottom portions of circumferential primary grooves | Presence | Presence | Presence | Presence |
| D2/T | 0.045 | 0.045 | 0.045 | 0.045 |
| WB/T | 0.45 | 0.45 | 0.45 | 0.45 |
| WB/W3 | 0.75 | 0.8 | 0.9 | 0.65 |
| Circular arc shape on edge cross-section of groove wall of apexes of the center block or not | No | No | No | Circular arc shape |
| Cord inclination angle of first cross belt layers | 26 | 26 | 26 | 26 |
| Cord inclination angle of second cross belt layers | 22 | 22 | 22 | 22 |
| Cut resistance | 117 | 116 | 115 | 119 |

TABLE 6

|  | Working Example 28 | Working Example 29 | Working Example 30 |
|---|---|---|---|
| Circumferential primary grooves with wave-like shape | Presence | Presence | Presence |

TABLE 6-continued

| | | | |
|---|---|---|---|
| WB/W1 | 0.75 | 0.75 | 0.75 |
| WB/W2 | 1.05 | 1.05 | 1.05 |
| Raised bottom portions of circumferential primary grooves | Presence | Presence | Presence |
| D2/T | 0.045 | 0.045 | 0.045 |
| WB/T | 0.45 | 0.45 | 0.45 |
| WB/W3 | 0.65 | 0.65 | 0.65 |
| Circular arc shape on edge cross-section of groove wall of apexes of the center block or not | Circular arc shape | Circular arc shape | Circular arc shape |
| Cord inclination angle of first cross belt layers | 20 | 22 | 24 |
| Cord inclination angle of second cross belt layers | 22 | 22 | 22 |
| Cut resistance | 120 | 121 | 120 |

| | Working Example 31 | Working Example 32 | Working Example 33 |
|---|---|---|---|
| Circumferential primary grooves with wave-like shape | Presence | Presence | Presence |
| WB/W1 | 0.75 | 0.75 | 0.75 |
| WB/W2 | 1.05 | 1.05 | 1.05 |
| Raised bottom portions of circumferential primary grooves | Presence | Presence | Presence |
| D2/T | 0.045 | 0.045 | 0.045 |
| WB/T | 0.45 | 0.45 | 0.45 |
| WB/W3 | 0.65 | 0.65 | 0.65 |
| Circular arc shape on edge cross-section of groove wall of apexes of the center block or not | Circular arc shape | Circular arc shape | Circular arc shape |
| Cord inclination angle of first cross belt layers | 22 | 22 | 22 |
| Cord inclination angle of second cross belt layers | 16 | 18 | 20 |
| Cut resistance | 122 | 123 | 122 |

TABLE 7

| | Working Example 34 |
|---|---|
| Circumferential primary grooves with wave-like shape | Presence |
| WB/W1 | 0.75 |
| WB/W2 | 1.05 |
| Raised bottom portions of circumferential primary grooves | Absence |
| D2/T | — |
| WB/T | 0.6 |
| WB/W3 | 0.4 |
| Circular arc shape on edge cross-section of groove wall of apexes of the center block or not | No |
| Cord inclination angle of first cross belt layers | 26 |
| Cord inclination angle of second cross belt layers | 22 |
| Cut resistance | 108 |

From Tables 1 to 3, it can be seen that the cut resistance is enhanced by making the ratio WB/W1 of the center block 16 from 0.6 to 0.9, and the ratio WB/W2 from 0.9 to 1.2, and W1 greater than W2. Also, by using the circumferential primary grooves 12 with a narrower groove width than the shoulder lug grooves 10, the cross-section of the center blocks 16 is increased compared with conventionally, so the traction performance is enhanced.

From Working Examples 10 to 12 and Working Example 3 in Table 4, it can be seen that it is desirable that the ratio D2/T is less than 0.5. From Working Examples 13 to 19 in Table 4, it can be seen that it is desirable that the ratio WB/T is from 0.35 to 0.55. From Table 5, it can be seen that it is desirable that the ratio WB/W3 is from 0.5 to 0.8, and that is desirable that the edge cross-section of the groove walls at the apexes of the center blocks 16 have a circular arc shape. From Table 6, it can be seen that it is desirable that the inclination angle with respect to the tire circumferential direction of the belt cords having the lowest inclination angle with respect to the tire circumferential direction within the first cross belt layers 6a is from 20 to 24 degrees, and it is desirable that the inclination angle with respect to the tire circumferential direction of the belt cords having the lowest inclination angle with respect to the tire circumferential direction within the second cross belt layers 6b is from 16 to 20 degrees.

In addition, as shown in Working Example 34 in Table 7, it can be seen that excellent cut resistance can be obtained with a tread pattern in which, from the tread pattern in FIG. 2, straight line shaped inclined lug grooves are used in which the first groove turning portion 14a and the second groove turning portion 14b are not provided, instead of the center lug grooves 14 in which the first groove turning portion 14a and the second groove turning portion 14b are provided.

This clearly demonstrates the effect of the present embodiment.

The foregoing has been a detailed description of the heavy duty pneumatic tire of the present technology. However, the present technology is not limited to the above embodiments, and may be improved or modified in various ways within the scope of the present technology.

The invention claimed is:

1. A heavy duty pneumatic tire with a tread pattern, comprising:
   a belt portion of a pneumatic tire that includes first cross belt layers made from a pair of belt layers in which each of the first cross belt layers has belt cords inclined with respect to a tire circumferential direction to one of a first side or a second side that are different from each other in a tire width direction relative to a tire equator line such that belt cords of one of the first cross belt layers cross belt cords of another of the first cross belt layers, and second cross belt layers provided on an outer side in a tire radial direction of the first cross belt layers, made from a pair of belt layers in which each of the second cross belt layers has belt cords inclined with respect to the tire circumferential direction to one of the first side or the second side that are different from each other in the tire width direction relative to a tire equator line such that belt cords of one of the second cross belt layers cross belt cords of another of the second cross belt layers;
   a tread pattern of the pneumatic tire including
   a plurality of center lug grooves provided at intervals in the tire circumferential direction, that pass through the tire equator line and having two ends in half tread regions on the first side and the second side in the tire width direction relative to the tire equator line;
   a plurality of shoulder lug grooves provided at intervals in the tire circumferential direction, extending toward an outer side in the tire width direction in each of the half tread regions with outer ends thereof in the tire width direction opening at ground contact edges on both sides in the tire width direction, each of the plurality of shoulder lug grooves being provided between center lug grooves that are adjacent to each other in the tire circumferential direction from among the center lug grooves;

a pair of circumferential primary grooves, one in each of the half tread regions, extending around the whole tire periphery while connecting alternately to an end of the center lug grooves and an end on the inner side in the tire width direction of the shoulder lug grooves to form a wave-like shape, and having a groove width narrower than that of the shoulder lug grooves provided in each half tread region; and a plurality of center blocks formed in one row in the tire circumferential direction partitioned by the center lug grooves and the pair of circumferential primary grooves; a block width WB of the center blocks in the tire width direction, a belt width W1 of a belt layer from among the first cross belt layers, and a belt width W2 of a belt layer from among the second cross belt layers being related with the ratio WB/W1 in the range from 0.6 to 0.9, the ratio WB/W2 in the range from 0.9 to 1.2, and W1 greater than W2, where the belt width W1 is a shorter belt width in the tire width direction among the first cross belt layers, and the belt width W2 is a shorter belt width in the tire width direction among the second cross belt layers; wherein the center lug grooves include a first groove turning portion on the first side, bent or curved so as to protrude towards a third side in the tire circumferential direction, and a second groove turning portion on the second side, bent or curved so as to protrude towards a fourth side on the opposite side to the third side in the tire circumferential direction, the center lug grooves each include a first connection end portion on the first side and a second connection end portion on the second side at which the center lug grooves connect to the circumferential primary grooves at a tip on the inner side in the tire width direction of the circumferential primary grooves, the second connection end portion of each of the center lug grooves being on the third side in the tire circumferential direction of the first connection end portion, in connection with a center line position in a groove width direction of the center lug grooves, an inclination angle with respect to the tire width direction of a first straight line that connects the first connection end portion and a protruding end that protrudes towards the third side in the tire circumferential direction of the first groove turning portion, and, an inclination angle with respect to the tire width direction of a second straight line that connects the second connection end portion and a protruding end that protrudes towards the fourth side in the tire circumferential direction of the second groove turning portion are larger than an inclination angle with respect to the tire width direction of a third straight line that connects the first connection end portion and the second connection end portion of each of the center lug grooves.

2. The heavy duty pneumatic tire according to claim 1, wherein in connection with the center line position in the groove width direction of the center lug grooves, a portion of each of the center lug grooves between the protruding end of the first groove turning portion that protrudes towards the third side in the tire circumferential direction and the first connection end portion is on the first straight line or on the third side thereof with respect to the first straight line, and a portion of each of the center lug grooves between the protruding end of the second groove turning portion that protrudes towards the fourth side in the tire circumferential direction and the second connection end portion is on the second straight line or on the fourth side thereof with respect to the second straight line.

3. The heavy duty pneumatic tire according to claim 1, wherein each of the pair of circumferential primary grooves includes a raised bottom portion in which a groove depth is shallower in part.

4. The heavy duty pneumatic tire according to claim 3, wherein the ratio D2/T of a groove depth D2 of a shallowest portion of the raised bottom portion and a tread width T in the tire width direction of the tread portion is less than 0.05.

5. The heavy duty pneumatic tire according to claim 1, wherein the ratio WB/T of a block width WB of the center blocks to a tread width T in the tire width direction of the tread portion is from 0.35 to 0.55.

6. The heavy duty pneumatic tire according to claim 1, wherein the belt portion further includes a pair of third cross belt layers provided on the outer side in the tire radial direction of the second cross belt layers, in which each of the third cross belt layers has belt cords inclined with respect to the tire circumferential direction to one of the first side or the second side that are different from each other in the tire width direction relative to a tire equator line such that belt cords of one of the third cross belt layers cross belt cords of another of the third cross belt layers, and the belt width W3 that is a shortest belt width in the tire width direction of a belt layer in the third cross belt layers satisfies the ratio WB/W3 in the range from 0.5 to 0.8, and W3 greater than W1.

7. The heavy duty pneumatic tire according to claim 1, wherein the circumferential primary grooves each include a third groove turning portion that turns in a protruding shape to the outer side in the tire width direction, and a fourth groove turning portion that turns in a protruding shape to the inner side in the tire width direction, and the circumferential primary grooves each have regions that include the third groove turning portion and the fourth groove turning portion where edge cross-sections of a groove wall on a side of each of the center blocks are rounded in a circular arc shape.

8. The heavy duty pneumatic tire according to claim 1, wherein the center lug grooves each include a lug groove turning portion in a bent shape or curved shape, and have regions that include the lug groove turning portion where an edge cross-section of the groove wall is rounded with a circular arc shape.

9. The heavy duty pneumatic tire according to claim 1, wherein a smallest inclination angle with respect to the tire circumferential direction of the belt cords in the first cross belt layers is from 20 to 24°.

10. The heavy duty pneumatic tire according to claim 1, wherein a smallest inclination angle with respect to the tire circumferential direction of the belt cords in the second cross belt layers is from 16 to 20°.

11. The heavy duty pneumatic tire according to claim 1, wherein all of corner portions of the center blocks are obtuse angle corner portions.

12. The heavy duty pneumatic tire according to claim 1, wherein groove widths of the pair of circumferential primary grooves and the center lug grooves are from 7 to 20 mm.

13. The heavy duty pneumatic tire according to claim 1, fitted to a construction vehicle or an industrial vehicle.

14. The heavy duty pneumatic tire according to claim 1, wherein the tread pattern includes a circumferential secondary groove having a groove depth shallower than a maximum groove depth of the circumferential primary grooves, the circumferential secondary groove connecting two center lug grooves adjacent in the circumferential direction of the plurality of the center lug grooves in such a manner that the circumferential secondary groove divides a region of each of the center blocks, and the circumferential secondary groove connecting the protruding end of the first groove turning portion of one groove of the two adjacent center lug grooves with the protruding end of the second groove turning portion of another groove of the two adjacent center lug grooves.

* * * * *